(12) United States Patent
Ducroquet

(10) Patent No.: US 11,110,771 B2
(45) Date of Patent: Sep. 7, 2021

(54) WHEEL AXLE FOR A COMBINE HARVESTER

(71) Applicant: AGCO Corporation, Duluth, GA (US)

(72) Inventor: Frederic Ducroquet, Châteaubriand (FR)

(73) Assignee: AGCO Corporation, Duluth, GA (US)

( * ) Notice: Subject to any disclaimer, the term of this patent is extended or adjusted under 35 U.S.C. 154(b) by 182 days.

(21) Appl. No.: 16/467,033

(22) PCT Filed: Nov. 30, 2017

(86) PCT No.: PCT/IB2017/001478
§ 371 (c)(1),
(2) Date: Jun. 5, 2019

(87) PCT Pub. No.: WO2018/104771
PCT Pub. Date: Jun. 14, 2018

(65) Prior Publication Data
US 2019/0315183 A1    Oct. 17, 2019

Related U.S. Application Data

(60) Provisional application No. 62/431,109, filed on Dec. 7, 2016.

(51) Int. Cl.
*B60B 35/10* (2006.01)
*B60G 21/00* (2006.01)
(Continued)

(52) U.S. Cl.
CPC ............ *B60G 21/007* (2013.01); *B60B 35/10* (2013.01); *B60G 3/26* (2013.01); *B60G 7/006* (2013.01);
(Continued)

(58) Field of Classification Search
CPC ...... B60G 21/007; B60G 3/26; B60G 7/0096; B60G 21/073; B60G 2200/144;
(Continued)

(56) References Cited

U.S. PATENT DOCUMENTS

| 2,071,577 | A | * | 2/1937 | Renwick | .................. B60G 3/26 |
| | | | | | 267/230 |
| 2,904,343 | A | * | 9/1959 | Taber | ........................ B62D 7/00 |
| | | | | | 280/43.18 |

(Continued)

FOREIGN PATENT DOCUMENTS

| EP | 1 520 775 A1 | 4/2005 |
| EP | 1 738 928 B1 | 6/2008 |
| JP | 2007 230517 A | 9/2007 |

OTHER PUBLICATIONS

European Patent Office, International Search Report for related International Application No. PCT/IB2017/001478, dated Mar. 27, 2018.

*Primary Examiner* — Karen Beck

(57) ABSTRACT

There is described a wheel axle for an agricultural vehicle such as a combine harvester. The wheel axle has at least one wheel suspension (32*a*) arranged to maintain a wheel axle parallel to the supporting surface, through use of a linkage arrangement (36, 38, 40) which is pivotally coupled to the axle frame (30). The configuration of the wheel suspension allows for the wheel axis to passively follow the surface profile, as any loads transmitted through the wheel carrier act to level out the wheel suspension to align with the underlying surface. As the wheel axle is adjusted to lie parallel with the underlying surface, accordingly the ground-contacting surface area of the associated wheels is maximised.

11 Claims, 6 Drawing Sheets

(51) Int. Cl.
*B60G 3/26* (2006.01)
*B60G 7/00* (2006.01)
*B60G 21/073* (2006.01)

(52) U.S. Cl.
CPC ...... *B60G 21/073* (2013.01); *B60G 2200/144* (2013.01); *B60G 2202/413* (2013.01); *B60G 2204/82* (2013.01); *B60G 2204/8304* (2013.01); *B60G 2300/08* (2013.01)

(58) Field of Classification Search
CPC .......... B60G 2202/413; B60G 2204/82; B60G 2204/8304; B60G 2300/08; B60G 2300/09; B60B 35/10; B60B 35/02
See application file for complete search history.

(56) References Cited

U.S. PATENT DOCUMENTS

| | | | | |
|---|---|---|---|---|
| 4,071,259 A | * | 1/1978 | Ernest | B60G 1/00 280/124.106 |
| 4,534,575 A | * | 8/1985 | Grove | B60G 17/005 180/41 |
| 4,696,152 A | * | 9/1987 | Kinzenbaw | A01D 75/285 180/41 |
| 6,406,043 B1 | * | 6/2002 | Balmer | B60B 35/003 180/403 |
| 2002/0074758 A1 | | 6/2002 | Frey | |
| 2006/0220331 A1 | * | 10/2006 | Schafer | B62D 57/024 280/6.154 |
| 2007/0170669 A1 | * | 7/2007 | Ehrhart | B62D 49/02 280/43.23 |
| 2008/0042329 A1 | * | 2/2008 | Deal | B60G 7/003 267/2 |
| 2008/0202828 A1 | * | 8/2008 | Kroth | F16D 3/04 180/6.38 |
| 2016/0280221 A1 | * | 9/2016 | Jung | A01D 41/127 |
| 2018/0236839 A1 | * | 8/2018 | Rasner | B62D 53/0857 |
| 2018/0281878 A1 | * | 10/2018 | Aoki | B62D 55/065 |
| 2019/0276102 A1 | * | 9/2019 | Zuleger | B60B 35/02 |
| 2020/0079167 A1 | * | 3/2020 | Brenner | B60G 7/008 |
| 2020/0236852 A1 | * | 7/2020 | Addifetti | A01D 75/287 |

\* cited by examiner

WHEEL AXLE FOR A COMBINE HARVESTER

FIELD OF THE INVENTION

The present invention relates to a wheel axle for use on a combine harvester, and a harvester or other agricultural vehicle having such an axle.

BACKGROUND OF THE INVENTION

Large agricultural vehicles, such as combine harvesters, often travel over uneven or inclined terrain. To provide for improved operator comfort by reducing cab movement, as well as to minimise the effects of soil compaction, such vehicles are often provided with adjustable wheel axles which allow for independent vertical movement of the combine wheels. An example of such a system is described in European Patent Number EP 1738928 B1. Combine harvesters are also particularly preferably provided with such wheel axle systems as they tend to comprise systems, such as grain pans and sieves, which work most efficiently when the vehicle is level.

As the vehicle weight of combine harvesters increases, some combines are provided with dual-tyre solutions, which act to distribute the weight of the combine over a larger ground-contact area. However, with reference to FIG. 1, such dual-tyre solutions present problems when used with the adjustable wheel axles as described above.

In FIG. 1, a cross-sectional view of a combine harvester is provided, having a known adjustable wheel axle. The main body of the combine harvester, indicated at 10, is at least partly supported by respective left and right dual tyres 12a,12b. The dual tyres 12a,12b are connected with the combine 10 via wheel axle 14.

The wheel axle 14 comprises an axle housing 16, on which are provided respective left and right wheel suspensions 18a,18b. The wheel suspensions 18a,18b each comprise an upper link 20a,20b and a lower link 22a,22b, wherein first ends of each of the links 20a,20b,22a,22b are pivotally attached to the axle housing 16. The opposite ends of the links 20a,20b,22a,22b of the left and right wheel suspensions 18a,18b are pivotally attached to respective left and right wheel carriers 24a,24b. The left and right dual tyres 12a,12b are supported on the respective left and right wheel carriers 24a,24b.

Through adjustment of appropriate shift modules (not shown) provided in the axle housing 14 and coupled with the respective lower links 22a,22b, the vertical position of the wheel carriers 24a,24b relative to the axle housing 14 can be varied. As a result, the vertical height of the axis of rotation of the left and right dual tyres 12a,12b can be adjusted as required. Due to the increased contact width provided by dual-tyre solutions, such vertical displacement of the left and right wheel axes A and B on inclined terrain will often result in a loss of surface contact, as illustrated in FIG. 1 where an entire tyre of both left and right dual tyres 12a,12b are not in contact with the inclined surface 26. Such reduced contact causes excessive stresses on the tyres and on the levelling system, resulting in increased likelihood of structural failure of components. In these situations, an operator is prompted to revert to a single-tyre system, or to forego use of the levelling system completely.

It is an object of the invention to provide a wheel axle system more suitable for use with dual-tyre solutions.

SUMMARY OF THE INVENTION

Accordingly, there is provided a wheel axle for an agricultural vehicle, preferably for a combine harvester, having a frame and at least one wheel suspension, the wheel suspension comprising:

a first body connected to the frame;

a distribution bar having a first end and an opposed second end, said distribution bar being pivotally mounted to the first body at a midpoint of the distribution bar between the first and second ends of the distribution bar;

a lift link pivotally connected to the frame, wherein the first end of the distribution bar is pivotally connected to a first end of the lift link;

a push link, wherein the second end of the distribution bar is pivotally connected to a first end of the push link; and a wheel carrier defining a wheel axis for a ground-contacting element to be mounted to the wheel carrier, wherein opposed second ends of the respective lift link and push link are pivotally coupled with the wheel carrier, such that the wheel carrier and wheel axis are adjustable relative to the frame.

The use of a central distribution bar which is pivotally mounted to a first body, the first body connected to the axle frame, provides a wheel suspension which can be adjusted relative to the axle frame. As the wheel carrier is moveable relative to the frame by action of the pivoting links and distribution bar, the wheel axis defined by the wheel carrier can move to follow variations in the terrain surface profile. Accordingly, the wheel carrier is adjusted to bring the wheel axis parallel to an underlying surface, to maximise the ground-contacting surface area of a ground-contacting element mounted to the wheel carrier. The configuration of the wheel suspension allows for the wheel axis to passively follow the surface profile, as any loads transmitted through the wheel carrier act to level out the wheel suspension to align with the underlying surface.

Preferably, the ground contacting element comprises a wheel. The ground contacting element may comprise a dual-wheel configuration.

A dual-wheel configuration provides a potentially larger maximum ground-contacting surface area, which can provide for a greater weight distribution for a combine harvester.

The distribution bar is pivotally mounted to the first body at a midpoint of the distribution bar, between the first and second ends of the distribution bar.

The distribution bar can pivot to accommodate the forces experienced in the lift and push links.

Preferably, a 4-bar linkage is formed between the distribution bar, the lift link, the push link, and the wheel carrier.

Preferably, the first body comprises an actuator, preferably a linear actuator, a first end of the actuator mounted to the frame, and wherein the distribution bar is pivotally mounted to the second end of the actuator.

Providing the first body as an actuator allows for the wheel suspension to be moved relative to the frame.

Preferably, the first end of the actuator is pivotally mounted to the frame.

Preferably, the actuator is a hydraulic cylinder, preferably a single-acting hydraulic cylinder.

Preferably, the wheel axle comprises left and right wheel suspensions, wherein hydraulic chambers of the respective hydraulic cylinders of the left and right wheel suspensions are fluidly connected.

As left and right actuator cylinders are fluidly connected, this allows for a self-balancing across the actuators between the left and right wheel suspensions. Such a passive adjustment of the actuators provides a reactive self-levelling system, for when the axle is traversing uneven ground.

Preferably, the wheel axle further comprises a stop element coupled between the frame and the wheel carrier, wherein the stop element prevents over-extension of the wheel carrier relative to the frame.

The stop element is used to prevent the wheel axis from moving to an unsafe angle, relative to the frame. The stop element may comprise any suitable mechanical stop, e.g. a cylinder stop, a chain, etc. In a further aspect, it will be understood that the components of the wheel suspension, e.g. the distribution bar, links, and/or wheel carrier, may incorporate suitable projections which can act to bear against portions of the other components, to prevent excessive relative movements of the components of the wheel suspension.

Preferably, the lift link comprises a triangle-shaped beam, wherein the first end is at a first vertex of the triangle, the second end is at a second vertex of the triangle, and a pivot point of the lift link is arranged at a third vertex of the triangle.

There is further provided an agricultural vehicle, preferably a combine harvester, having at least one wheel axle as described above.

DETAILED DESCRIPTION OF THE INVENTION

Embodiments of the invention will now be described, by way of example only, with reference to the accompanying drawings, in which.

Figure 2:
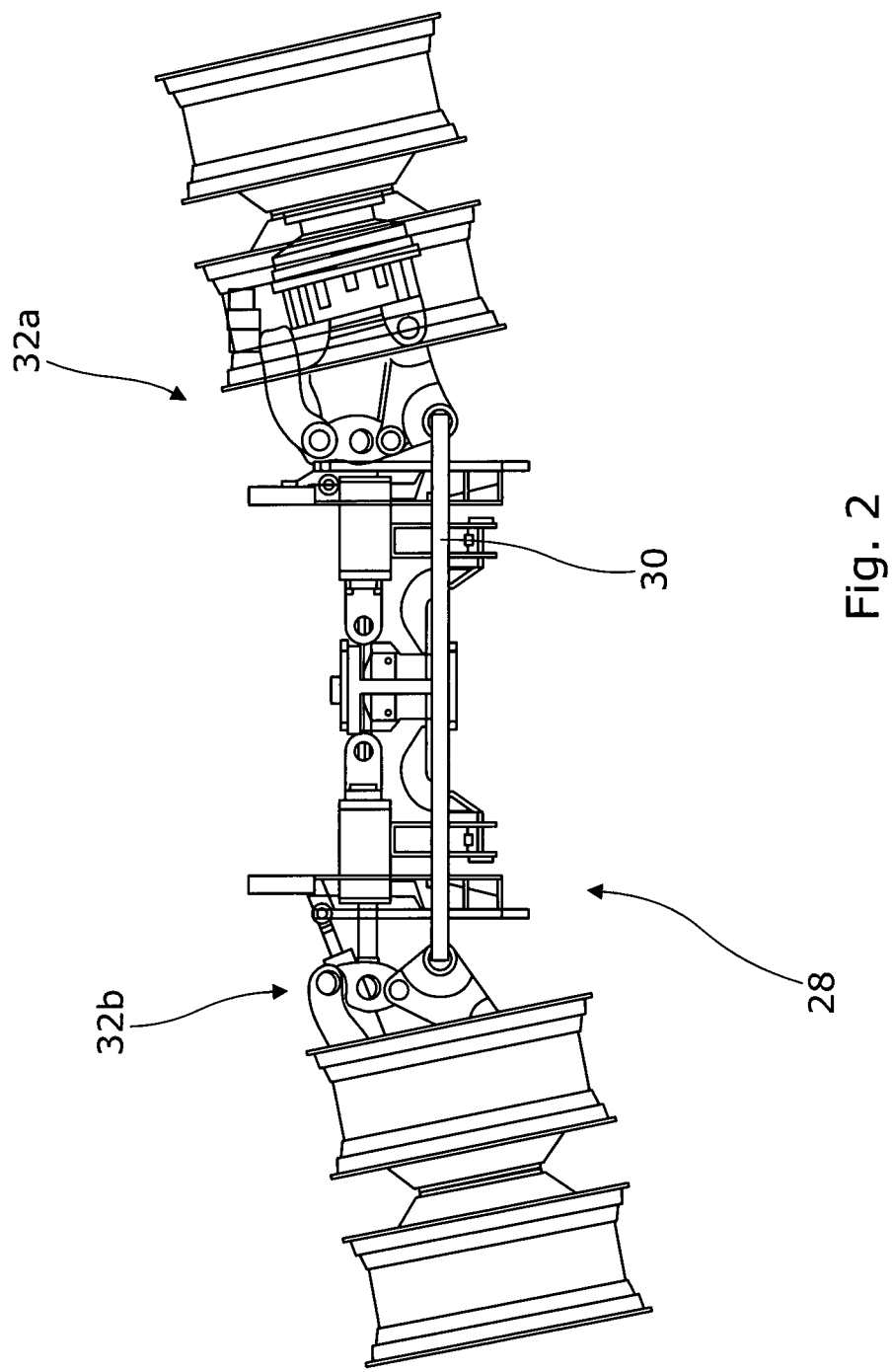
FIG. 2 is an illustration of a wheel axle according to the invention.

With reference to FIG. 2, a wheel axle according to the invention is indicated at 28. The wheel axle 28 comprises an axle frame (indicated in outline at 30), on which are provided respective right and left wheel suspensions 32a,32b.

The features of the wheel suspensions 32a,32b will be described with reference to the enlarged view of the right wheel suspension 32a provided in FIG. 3. It will be understood that the components of the right wheel suspension 32a are replicated in the left wheel suspension 32b.

The wheel suspension 32a comprises a first body in the form of a linear actuator 34 pivotally attached to the axle frame 30 at a first end 34a of the actuator 34. Preferably, the first body 34 is provided as a hydraulic cylinder. A distribution bar 36 is pivotally mounted at the opposite end 34b of the linear actuator 34, the distribution bar 36 mounted to the linear actuator 34 at a midpoint of the distribution bar 36.

A lift link 38 is provided as a generally triangle-shaped beam, but it will be understood that other link shapes may be provided. The lift link 38 is pivotally mounted to the frame 30 at a pivot point located at a first vertex 38a of the triangle-shaped beam. The lift link 38 is pivotally coupled to a first end 36a of the distribution bar 36 at a first end of the lift link 38, located at a second vertex 38b of the triangle-shaped beam.

A push link 40 is further provided, a first end 40a of the push link 40 pivotally coupled with a second end 36b of the distribution bar 36, opposite the first end 36a of the distribution bar 36. The first and second ends 36a,36b of the distribution bar 36 are located on opposite sides of the pivotal connection to the linear actuator 34.

Figure 3:
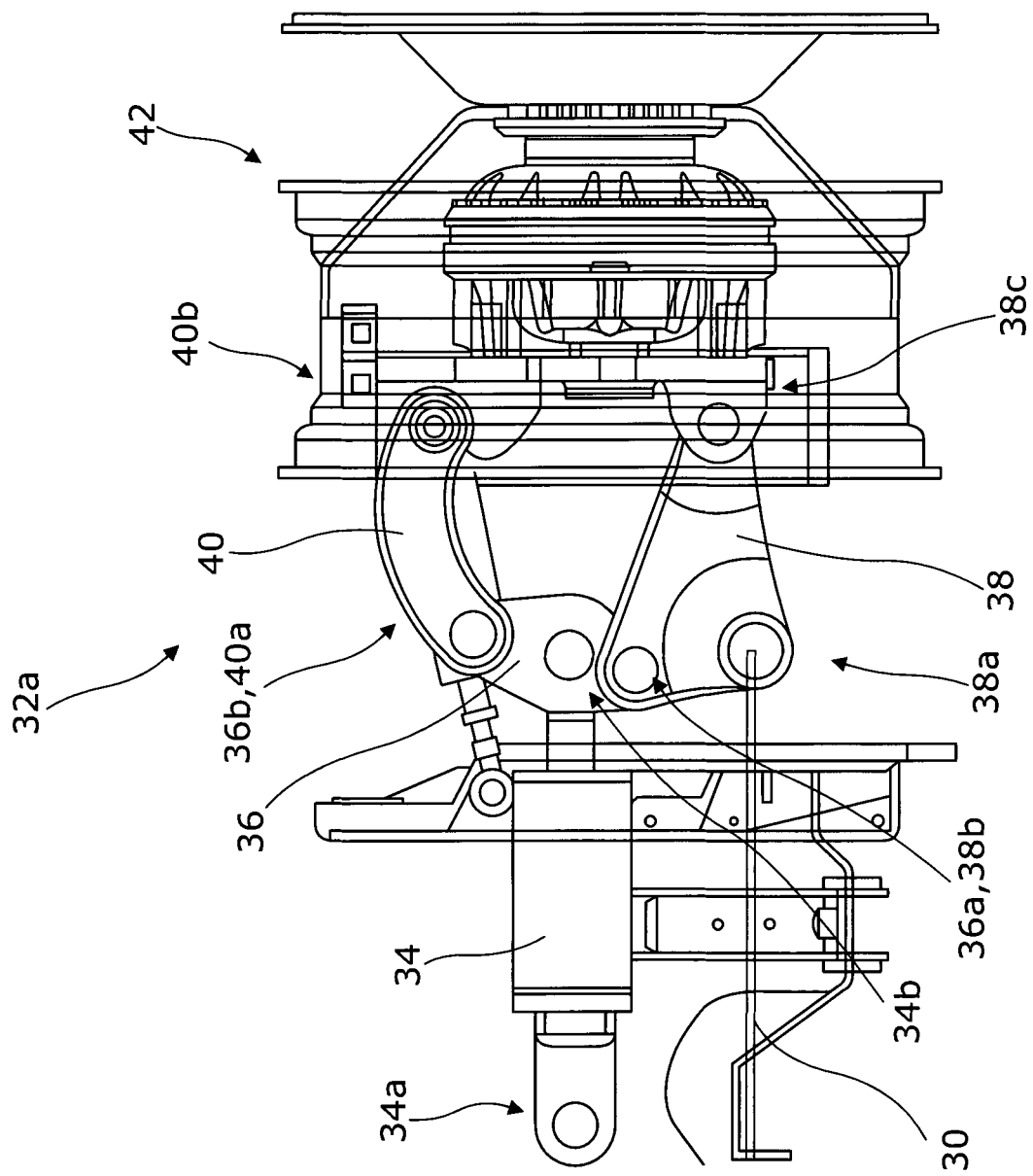
FIG. 3 is an enlarged cross-sectional view of a wheel suspension of the wheel axle of FIG. 2.

The wheel suspension further comprises 32a further comprises a wheel carrier 42 which defines a wheel axis for a ground-contacting element to be mounted to the wheel carrier 42, partly shown in outline in FIG. 3. The ground-contacting element is preferably a wheel or tyre, preferably provided in a dual-wheel configuration. The wheel carrier 42 is pivotally coupled to a second end of the lift link 38, the located at a third vertex 38c of the triangle-shaped beam. The wheel carrier 42 is further pivotally coupled to the push link 40, at a second end 40b of the push link 40. As a result, a 4-bar linkage is effectively formed between the distribution bar 36, the lift link 38, the push link 40, and the wheel carrier 42.

As a result of the pivotal connections of the different links of the wheel suspension 32a, the wheel carrier 42 and the wheel axis defined by the wheel carrier 42 are adjustable relative to the axle frame 30. In particular, as the wheel carrier 42 is effectively mounted to the axle frame 30 at the first end 34a of the actuator 34 and the pivoted coupling at 38a of the lift link 40, a distributed linkage is provided which can be used to bring the wheel axis of the wheel carrier 42 parallel to an underlying surface, to maximise the ground-contacting surface area of a ground-contacting element mounted to the wheel carrier 42. The distribution bar 36 acts to balance the movement forces applied to the wheel carrier 42 via the lift link 38 and the push link 40. The configuration of the wheel suspension allows for the wheel axis to passively follow the surface profile, as any loads transmitted through the wheel carrier act to level out the wheel suspension to align with the underlying surface.

Figure 4:
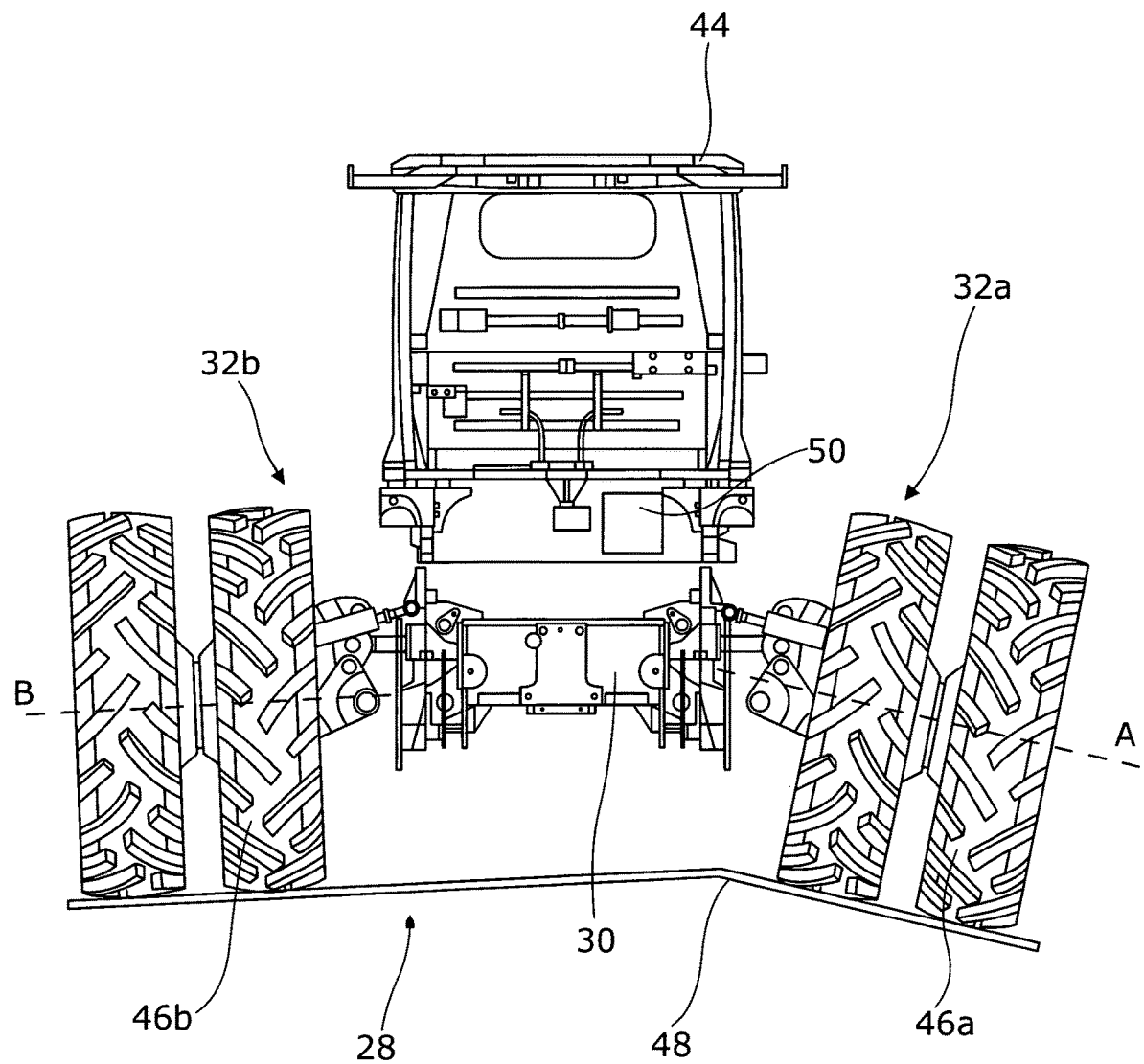
FIG. 4 is a cross-sectional view of a combine harvester having a wheel axle as shown in FIG. 2.

With reference to FIG. 4, an example of a wheel axle 28 according to the invention is illustrated as part of a vehicle in the form of combine harvester 44 when at least partly supported by respective right and left dual tyres 46a,46b. The dual tyres 46a,46b are mounted on the wheel carriers 34 of respective right and left wheel suspensions 32a,32b of the wheel axle 28, along respective left and right wheel axes A and B. In FIG. 4, the underlying terrain 48 is uneven, but the wheel suspensions 32a,32b are configured to adjust the alignment of the wheel carriers 34 and associated dual tyres 46a,46b such that the respective left and right wheel axes A and B lie substantially parallel to the underlying surface 48. As a result, the dual tyres 46a,46b are adjusted to have maximum ground-contacting surface area.

The actuation of the linear actuators 34 of the wheel suspensions 32a,32b may be individually controlled and adjusted by a central controller 50 provided as part of the vehicle 44. In an additional or alternative aspect, when the linear actuators 34 are provided as hydraulic cylinders, the wherein hydraulic chambers of the respective hydraulic cylinders 34 of the left and right wheel suspensions 32a,32b can be fluidly connected. Linking of the cylinders of the suspensions allows for a self-balancing across the actuators between the left and right wheel suspensions 32a,32b. Such a passive adjustment of the actuators provides a reactive self-levelling system, for when the axle 28 is traversing uneven ground.

Figure 5:
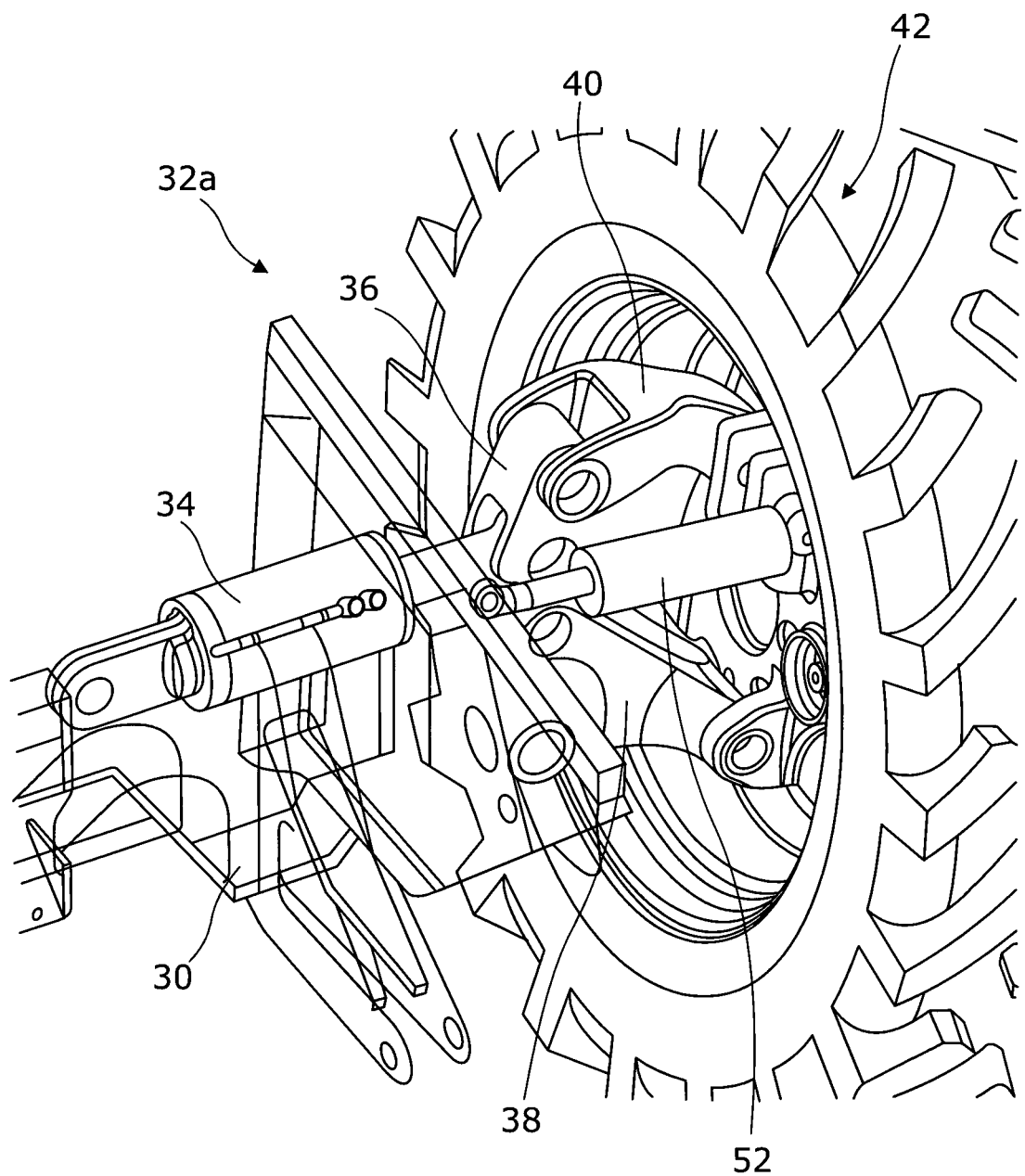
FIG. 5 is an enlarged perspective view of a wheel suspension of the wheel axle of FIG. 4.

With reference to FIG. 5, the wheel suspensions 32a,32b of the wheel axle 28 each comprise a stop element 52 coupled between the frame 30 and the wheel carrier 42. The stop element 52 acts to prevent over-extension of the wheel carrier 42 relative to the frame 30, which could result in unsafe wheel angles. In the embodiment of FIG. 5, the stop element 52 is provided as a cylinder stop, but it will be understood that any suitable mechanical stop may be used e.g. a chain of fixed length coupled between the frame 30 and the wheel carrier 42, etc. Alternatively, it will be understood that the components of the wheel suspension 32a,32b, e.g. the distribution bar 36, the links 38,40, and/or the wheel carrier 42, may incorporate suitable projections which can act to bear against portions of the other components, to prevent excessive relative movements of the components of the wheel suspension 32a,32b.

It will be understood that further variations of the system may be provided, for example an application where a 4-bar linkage is provide having a connection sensitive to wheel torque.

The wheel axle 38 of the invention may be provided as part of any suitable agricultural vehicle, preferably a combine harvester.

By providing for adjustment of the vertical alignment of the wheel carriers of the axle, as a result the wheel axes of both the left and right wheel can be separately aligned with the slope of the underlying surface. Accordingly, wheels or tracks carried on the wheel axle can be configured to more closely follow the ground slope, thereby ensuring maximum ground-contacting surface area.

Figure 6:
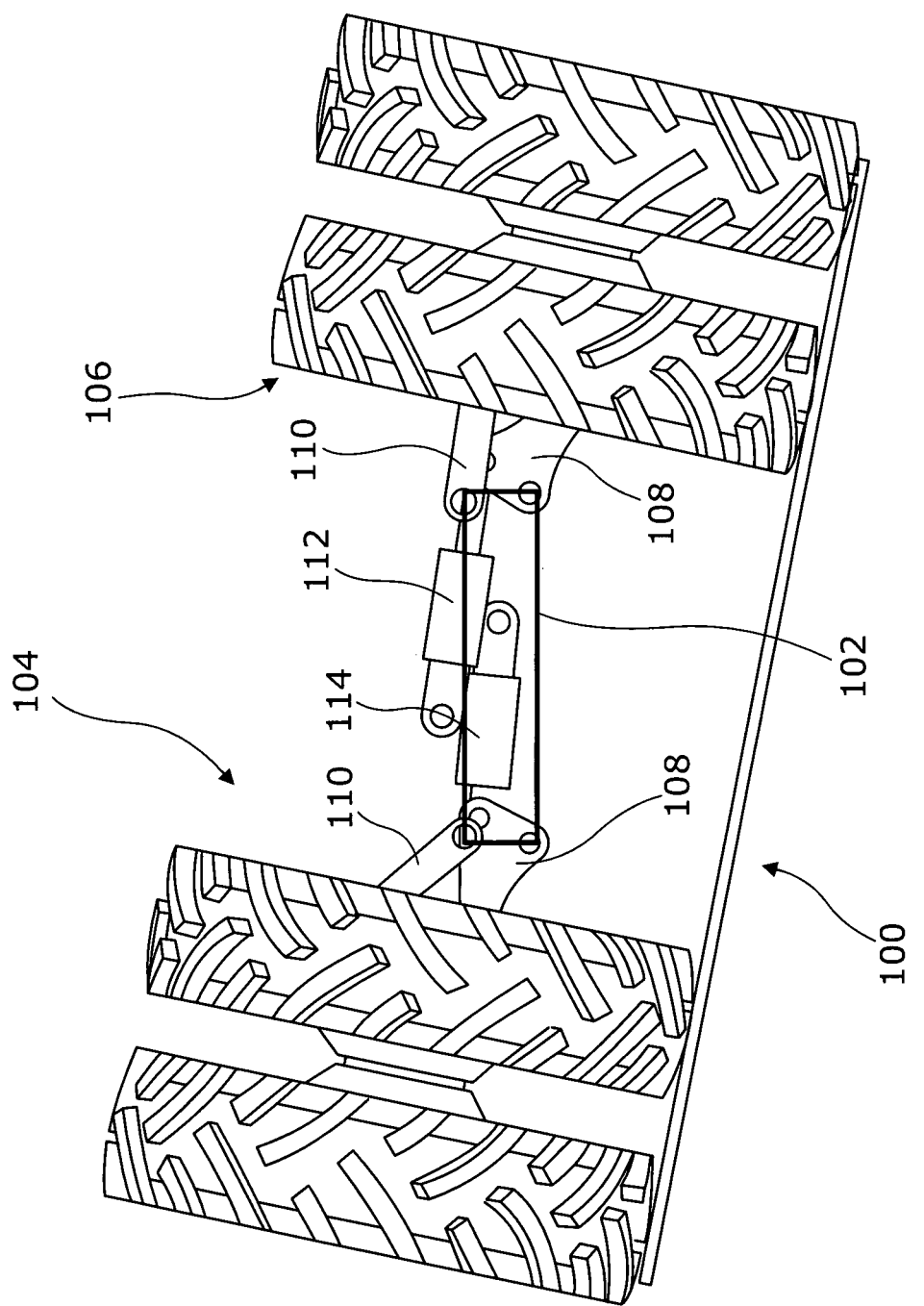
FIG. 6 is an illustration of an alternative construction of wheel axle according to the invention.

In a further aspect, an example of an alternative construction of a wheel axle is shown in FIG. 6. In this embodiment, the wheel axle 100 comprises a frame 102 and left and right wheel carriers 104,106 supporting left and right ground-contacting elements. The wheel carriers 104,106 are each coupled to the frame 102 with respective first and second links 108,110 pivotally attached to the frame 102 and the wheel carriers 104,106. As a result, 4-bar linkages are formed between the respective wheel carriers, the frame 102, and the respective first and second links 108,110.

The wheel axle 100 further comprises left and right actuators 112,114 each coupled to the frame 102 and to the first links 108 of the left and right wheel carriers 104,106. The actuators 112,114 can be adjusted in order to vary the position of the 4-bar linkages.

Figure 1:
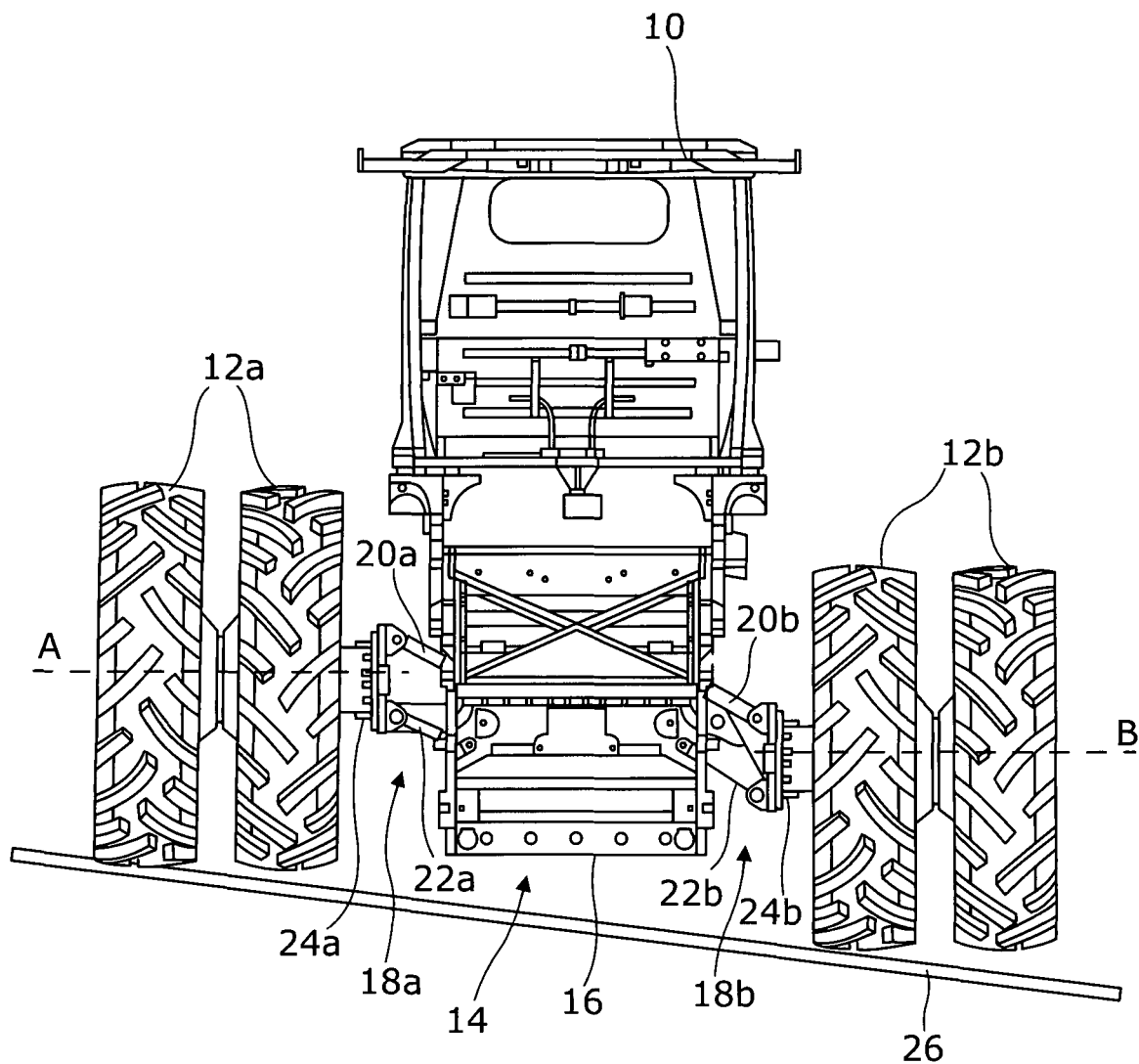
FIG. 1 is a cross-sectional view of a prior art combine harvester having a wheel axle levelling solution.

In contrast to the parallel 4-bar linkage systems of the prior art as illustrated in FIG. 1, the links 108,110 are configured to form a non-parallel 4-bar linkage with the axle frame 102. Accordingly, the angle of the respective wheel carriers 104,106 is varied as the linkages are adjusted. This allows for both vertical and horizontal displacement of the wheel carriers 104,106, to adjust for variations in the underlying terrain. Such a system is particularly useful for sidehill correction, as illustrated in FIG. 6.

The invention is not limited to the embodiments described herein, and may be modified or adapted without departing from the scope of the present invention.

The invention claimed is:

1. A wheel axle for a combine harvester having a frame and at least one wheel suspension, the wheel suspension comprising:
    a first body connected to the frame;
    a distribution bar having a first end and an opposed second end, said distribution bar being pivotally mounted to the first body at a midpoint of the distribution bar between the first and second ends of the distribution bar;
    a lift link pivotally connected to the frame, wherein the first end of the distribution bar is pivotally connected to a first end of the lift link;
    a push link, wherein the second end of the distribution bar is pivotally connected to a first end of the push link; and
    a wheel carrier defining a wheel axis for a ground-contacting element to be mounted to the wheel carrier, wherein opposed second ends of the respective lift link and push link are pivotally coupled with the wheel carrier, such that the wheel carrier and wheel axis are adjustable relative to the frame, wherein the first body comprises an actuator having a first end mounted to the frame, and wherein the distribution bar is pivotally mounted to the second end of the actuator.

2. The wheel axle of claim 1, wherein a 4-bar linkage is formed between the distribution bar, the lift link, the push link, and the wheel carrier.

3. The wheel axle of claim 1, wherein the first end of the actuator is pivotally mounted to the frame.

4. The wheel axle of claim 1, wherein the actuator is a hydraulic cylinder.

5. The wheel axle of claim 4, wherein the wheel axle comprises left and right wheel suspensions, wherein hydraulic chambers of respective hydraulic cylinders of the left and right wheel suspensions are fluidly connected.

6. The wheel axle of any one of claim 1, wherein the wheel axle further comprises at least one stop element coupled between the frame and the wheel carrier, wherein the stop element prevents over-extension of the wheel carrier relative to the frame.

7. The wheel axle of claim 6, wherein the at least one stop element is selected from the following: a cylinder stop, a chain, a bearing projection.

8. The wheel axle of any one of claim 1, wherein the lift link comprises a triangle-shaped beam, wherein the first end is at a first vertex of the triangle, the second end is at a second vertex of the triangle, and a pivot point of the lift link is arranged at a third vertex of the triangle.

9. The wheel axle of any of claim 1, wherein the ground contacting element comprises a wheel.

10. The wheel axle of claim 9, wherein the ground contacting element comprises a dual wheel.

11. A combine harvester having at least one wheel axle as claimed in any one of claim 1.

* * * * *